US008897102B1

(12) United States Patent
Lin et al.

(10) Patent No.: US 8,897,102 B1
(45) Date of Patent: Nov. 25, 2014

(54) METHOD AND SYSTEM FOR MEASURING LIGHT DELIVERY OFFSETS IN A HEAT ASSISTED MAGNETIC RECORDING HEAD (71) Applicant: Western Digital (Fremont), LLC, Fremont, CA (US)

(72) Inventors: Paul Lin, Fremont, CA (US); Zhong Shi, Dublin, CA (US); Lei Wang, Danville, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 0 days.

(21) Appl. No.: 13/908,968

(22) Filed: Jun. 3, 2013

Related U.S. Application Data (60) Provisional application No. 61/807,586, filed on Apr. 2, 2013.

(51) Int. Cl.
*G11B 11/00* (2006.01)
*G11B 5/48* (2006.01)
(52) U.S. Cl.
CPC .................................. *G11B 5/4826* (2013.01)
USPC ...................................................... 369/13.12
(58) Field of Classification Search
None
See application file for complete search history.

(56) References Cited

U.S. PATENT DOCUMENTS

| | | | |
|---|---|---|---|
| 5,357,536 A | 10/1994 | Andrews | |
| 6,627,096 B2 | 9/2003 | Sherrer et al. | |
| 6,744,582 B2 | 6/2004 | Shimoda et al. | |
| 6,747,257 B1 | 6/2004 | Farnsworth et al. | |
| 6,838,689 B1 | 1/2005 | Deng et al. | |
| 7,196,356 B2 | 3/2007 | Ishii et al. | |
| 7,310,206 B2 | 12/2007 | Liu et al. | |
| 7,405,093 B2 | 7/2008 | Andrews | |
| 7,480,214 B2 | 1/2009 | Challener et al. | |
| 7,502,397 B2 | 3/2009 | Naganuma | |
| 7,522,649 B2 | 4/2009 | Ha et al. | |
| 7,688,689 B2 | 3/2010 | Gage et al. | |
| 7,710,686 B2 | 5/2010 | Kim et al. | |
| 7,724,470 B2 | 5/2010 | Poon et al. | |
| 7,808,744 B2 | 10/2010 | Burbank et al. | |
| 7,843,074 B2 | 11/2010 | Gao et al. | |
| 7,898,759 B2 | 3/2011 | Matsumoto et al. | |
| 8,012,804 B1 | 9/2011 | Wang et al. | |
| 8,116,171 B1 | 2/2012 | Lee | |
| 8,125,856 B1 | 2/2012 | Li et al. | |
| 8,248,898 B2 * | 8/2012 | Schreck et al. | 369/13.33 |
| 8,358,565 B2 | 1/2013 | Komura et al. | |
| 8,456,961 B1 * | 6/2013 | Wang et al. | 369/13.01 |
| 8,488,435 B2 | 7/2013 | Snyder | |

(Continued)

OTHER PUBLICATIONS

U.S. Appl. No. 13/332,293 to Lei Wang, et al., filed Dec. 20, 2011, 31 pages.

*Primary Examiner* — Brenda Bernardi (57) ABSTRACT

A heat assisted magnetic recording (HAMR) transducer resides on a slider, has an air-bearing surface (ABS) and has a back side. The HAMR transducer includes a target waveguide, a plurality of assistant cores and a plurality of output devices. The target waveguide has an entrance at the back side and directs energy provided by a laser from the entrance at the back side toward the ABS. The assistant cores have a plurality of assistant core entrances at the back side. The assistant cores direct energy from the assistant core entrances to the output devices. In some aspects, the assistant cores and output devices may be used in aligning the laser and the target waveguide or checking the alignment of the laser and the target waveguide.

19 Claims, 7 Drawing Sheets

(56) References Cited

U.S. PATENT DOCUMENTS

| | | | |
|---|---|---|---|
| 8,588,039 B1 * | 11/2013 | Shi et al. | 369/13.33 |
| 8,593,914 B2 | 11/2013 | Wang et al. | |
| 8,670,295 B1 | 3/2014 | Hu et al. | |
| 2002/0110335 A1 | 8/2002 | Wagner et al. | |
| 2002/0163865 A1 | 11/2002 | Zimmer et al. | |
| 2006/0005216 A1 | 1/2006 | Rausch | |
| 2006/0233061 A1 | 10/2006 | Rausch et al. | |
| 2007/0015313 A1 | 1/2007 | Kwak et al. | |
| 2007/0081427 A1 | 4/2007 | Suh et al. | |
| 2008/0158730 A1 | 7/2008 | Furukawa et al. | |
| 2008/0204916 A1 | 8/2008 | Matsumoto et al. | |
| 2008/0316872 A1 | 12/2008 | Shimizu et al. | |
| 2009/0059411 A1 | 3/2009 | Tanaka et al. | |
| 2010/0208378 A1 | 8/2010 | Seigler et al. | |
| 2010/0208391 A1 | 8/2010 | Gokemeijer | |
| 2011/0141862 A1 | 6/2011 | Arai et al. | |
| 2012/0092971 A1 * | 4/2012 | Schreck et al. | 369/13.24 |
| 2012/0127838 A1 | 5/2012 | Komura et al. | |
| 2012/0163137 A1 | 6/2012 | Wang et al. | |

* cited by examiner

METHOD AND SYSTEM FOR MEASURING LIGHT DELIVERY OFFSETS IN A HEAT ASSISTED MAGNETIC RECORDING HEAD

CROSS-REFERENCE TO RELATED APPLICATIONS

This application claims priority to provisional U.S. Patent Application Ser. No. 61/807,586, filed on Apr. 2, 2013, which is hereby incorporated by reference in its entirety.

BACKGROUND

In fabricating disk drives, such as heat assisted magnetic recording (HAMR) disk drives, it may be necessary to bond components together. For example, in conventional HAMR disk drives, a laser provides energy used to heat the media for magnetic recording. The laser typically takes the form of a laser diode. The laser diode provides light to a waveguide that is on the substrate. The waveguide then directs light toward the media. For the HAMR disk drive to function as desired, the region at which the laser emits light (emission exit) is aligned with the entrance of the waveguide. The laser and slider are then bonded together.

In order to align the laser diode with the waveguide, fiducial marks are typically used. Both the laser diode (or laser subassembly) and the slider typically include fiducial marks. The fiducial marks on the laser diode are aligned with corresponding fiducial marks on the slider. The two components are then bonded together.

Although the conventional method of bonding the laser diode to the slider may function, misalignments may arise. For example, alignment using fiducial marks may not sufficiently align the emission exit of the laser with the waveguide entrance. In addition, the laser diode may shift with respect to the slider during bonding. As a result, the laser may not provide a desired amount of light to the waveguide entrance for the conventional HAMR disk drive to function as desired. Accordingly, what are needed are improved methods and systems for providing HAMR disk drives having the desired alignment between the laser and slider.

DETAILED DESCRIPTION OF EMBODIMENTS OF THE INVENTION

Figure 1:
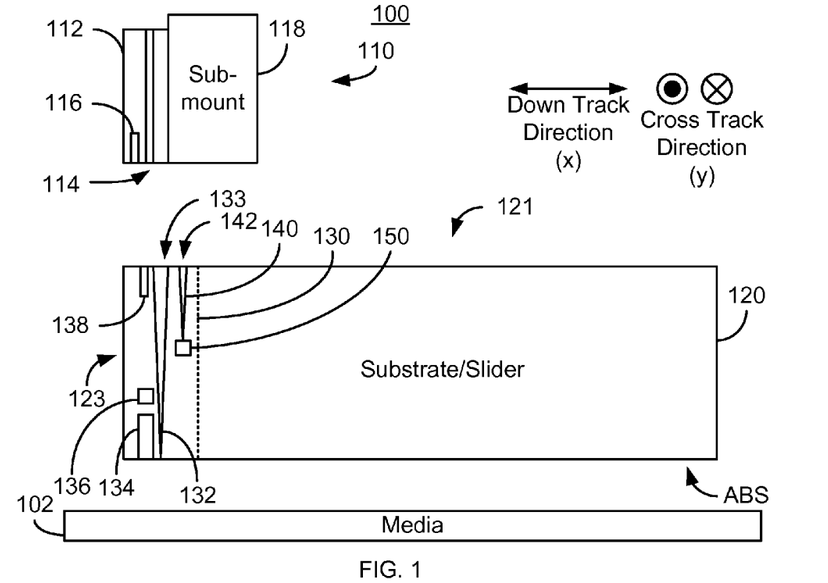
FIG. 1 is an exploded view of an exemplary embodiment of a HAMR disk drive.

FIG. 1 depicts an exemplary embodiment of a HAMR disk drive. For clarity, FIG. 1 is not to scale. Further, for simplicity, not all components are shown or labeled in FIG. 1. The HAMR disk drive includes a media 102, a laser subassembly 110 and a slider 120 on which a HAMR transducer 130 is formed. The laser subassembly 110 includes a laser 112 having an emission exit 114 and, in some embodiments, alignment mark(s) (or fiducial marks) 116. For simplicity, only one fiducial mark 116 is shown, though multiple fiducial marks may be used The slider 120 has a back side 121 to which the laser subassembly 110 is to be bonded as well as an air-bearing surface (ABS). In the embodiment shown, the back side is opposite to the ABS. However, in other embodiments, the back side (i.e. the side to which the laser 114 is bonded) may not be opposite to the ABS.

The HAMR transducer 130 includes a waveguide 132, a write pole 134 and at least one coil 136 for energizing the write pole 134. In some embodiments, other components such as shields, a near-field transducer, and/or other poles may be included. A single waveguide 132, a single write pole 134 and a single coil 136 are shown. However, in other embodiments, multiple waveguide(s) 132, pole(s) 134 and/or coil(s) 136 may be used. Further, some of the components shown may be omitted. The waveguide 132 has an entrance 133 for receiving energy from the emission exit 114 of the laser 112. The waveguide 132 may also be termed a "target" waveguide 132 because the entrance 133 is the target for alignment to the emission exit 114 of the laser 112. The pole 134 is energized using the coil(s) 136 and may record to the desired spot on the media 102 when the spot is heated using energy from the waveguide 132.

Also shown is a fiducial mark 138 that corresponds to the fiducial mark 116. Thus, in bonding the laser subassembly 110 to the slider 120, the fiducial marks 116 and 138 are aligned. Additional alignment procedures, including but not limited to active alignment in which light from the laser 112 is used, may also be used to align the laser subassembly 110 with the slider 120.

The HAMR transducer 130 also includes one or more assistant cores 140 and output devices 150. For simplicity, only one assistant core 140 and one output device 150 is shown in FIG. 1. Each assistant core 140 has an entrance 142 at the back side 121 and is configured to guide energy from the entrance 142 to the output device 150. Thus, the assistant core 140 is a waveguide. The assistant core 140 may thus include cladding that may be formed of tantalum oxide and cladding that may include aluminum oxide or silicon dioxide. In some embodiments, other material(s) may be used. The output device 150 may be an output grating, a charge coupled device (CCD) or other analogous device. Other embodiments may use self-contained optical-to-electrical (OE) conversion or photodiode for the output device 150.

In some embodiments, a single output device 150 corresponds to each assistant core 140. However, in other embodiments, multiple output devices 150 may correspond to each assistant core 140 or vice versa. Although one assistant core may be used, better information may be obtained using multiple assistant cores.

The assistant cores 140 may be used in aligning the laser 112 with the target waveguide 132 or may be used to check the alignment between the emission exit 114 and the waveguide entrance 133 if the subassembly 110 is already bonded to the slider 120. Thus, although one assistant core 140 is shown, multiple assistant cores may be used. In addition, the assistant cores 140 may be distributed around the target waveguide 132. Stated differently, the entrances 142 of the assistant cores may be around target waveguide entrance 133 in the plane of the slider back side 121. The assistant core entrances 142 may also be in a desired range of distance(s) from the entrance 133 of the target waveguide 132. For example, the entrances 142 of the assistant cores 140 may be a distance from the entrance 133 of the target waveguide 132 that is greater than the radius of the spot size for the laser 112, on the order of the desired alignment tolerances, and/or not so far from the target waveguide entrance 133 that light from the laser 112 only strikes the assistant core entrance 132 if no light from the laser 112 strikes the entrance 133 of the target waveguide 132. For example, in some embodiments, the entrance 142 of the assistant core 140 is at least one-half micron from the entrance 133 of the target waveguide 132. In some embodiments, the entrance 142 of the assistant core 140 is not more than one and one-half micron from the entrance 133 of the target waveguide 132. In some embodiments, the entrance 142 of the assistant core 140 is at least one-half micron from the entrance 133 of the target waveguide 132 and not more than one and one-half micron from the entrance 133 of the target waveguide 132. In other embodiments, other spacings may be used. In addition, the spot from the laser and the waveguide coupling mode need not be circular nor the same size in the down track and cross track directions. In general, the spacing between the target waveguide entrance 133 and the entrance 142 of an assistant core 140 is desired to be sufficiently small that a sufficient signal may be obtained from the output device 150. The spacing is also desired to be sufficiently large that crosstalk (noise from communication between assistant cores 140) is sufficiently small. In general, it is believed that a smaller spacing between the target waveguide entrance 133 and the assistant core entrance 142 results in improved resolution but may sacrifice field of view.

The HAMR transducer 130 and disk drive 100 may have improved alignment. Light from the laser 112 coupled into the entrances 142 of the assistant cores 140 may be output by the output devices 150. The intensity of the output light may be measured. This light may be measured during alignment to improve the alignment of the emission exit 114 and the target waveguide. More specifically, the intensity of the light at each of the output devices 150 may be measured to determine whether the emission exit 114 and waveguide entrance 133 are aligned. The relative locations of the slider 120 and laser subassembly 110 may then be adjusted. In some embodiments, the post-bonding alignment of the laser subassembly 110 and the HAMR transducer 130 in the disk drive 100 may be better able to be checked. In such an embodiment, the intensity of the light output by each of the output devices 150 may be measured and compared to determine how well the laser emission exit 114 and target waveguide entrance 133 are aligned.

In some embodiments, the alignment offset between the emission exit 114 and the target waveguide entrance 133 may be determined using the detected signal from the output device 150 for each assistant core 140. The signal from each assistant core 140/output device 150 is represented by a separate parameter in an offset calculation equation. For example, in some embodiments, a center of mass (COM) calculation may be used. The COM corresponds to the center of the intensity of the signals. Thus, the COM may correspond to the center of the emission exit 142. The output level of each assistant core 140 may be normalized with respect to each other in this case. For example, assuming that four assistant cores 140 are distributed in a rectangle around the target waveguide 132. The target waveguide 132 may thus be considered to be at (0,0) in an x-y coordinate system. The assistant cores 140 are at (x,y), (−x,y), (x,−y) and (−x,−y). Suppose also that A, B, C, D are the respective signals measured at each assistant core 140, and x, y are the core distances from origin.

$$X_{COM} = (-A*x + B*x - C*x + D*x)/(A+B+C+D)$$

$$Y_{COM} = (A*y + B*y - C*y - D*y)/(A+B+C+D)$$

In some embodiments, these COM values are used to determine the location of the emission exit 114 with respect to the entrance 133 of the target waveguide 132. In other embodiments, a calibration factor may be applied to find alignment offsets as a function of the COM, $X_{offset}(X_{COM})$ and/or $Y_{offset}(Y_{COM})$. In other embodiments, a linear regression model may be used fit to arrive at an equation for offset. In this case, normalizing the output level of each core may not be as important. The basic equation in one such embodiments is as follows, with X1-X5, Y1-Y5 (where X5 and Y5 are absolute values of the x and y coordinates of a fifth assistant core):

$$X_{offset} = X1*A + X2*B + X3*C + X4*D + X5$$

$$Y_{offset} = Y1*A + Y2*B + Y3*C + Y4*D + Y5$$

These calculations may be extended for another number of cores at different locations. In addition, if a feedback signal is available from the target waveguide 132, the feedback signal may also be included in the calculations. One benefit of using assistant core waveguide signals as separate parameters is that the alignment offset may be deterministically calculated as shown above (as opposed to using other methods such as neural nets, fuzzy logic, human interpretation, and/or other mechanisms). However, in other embodiments, data from the output devices 150 may be used to determine the offset in the alignment in another manner. For example, in some embodiments, a metric extraction may use look-up-tables or find closest matched location to computer modeling. For instance if modeling shows a Gaussian fit, then use of a similar Gaussian fit to the data may be appropriate. Other more complex modeling curves may also be matched by using convolution and/or other vision-based processing techniques. Some of these other methods may find a depth offset (Z-distance between the emission exit and the back side 121 in a direction normal to the back side 121). The depth offset may use assumptions for parameters such as angle and mode shape of the light source. Other models may also be used to take information from the assistant cores 140 and determine the misalignment between the emission exit 114 and the target waveguide entrance 133.

Thus, using the methods above and/or other methods, the signal(s) from the output device(s) 150 and, therefore, from the assistant core(s) may be used in aligning the emission exit 114 of the laser 112 with the entrance 133 of the target waveguide 132. Alignment prior to bonding and/or a post-bond alignment check may be improved. As a result, the power provided by the laser 112 may be better aligned with the waveguide 132. The power provided to the media 102 for recording may likewise be enhanced. Thus, performance of the HAMR disk drive 100 may be improved.

Figure 2A:
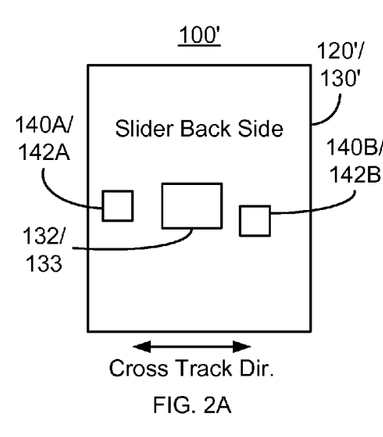
FIGS. 2A-2B are diagrams depicting the back side and side views of an exemplary embodiment of a HAMR transducer.
Figure 2B:
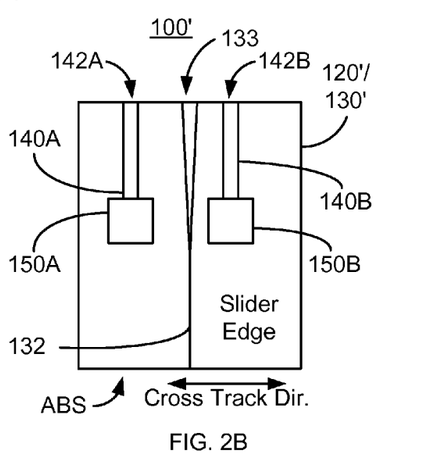

FIGS. 2A and 2B depict back side and down track views, respectively, of an exemplary embodiment of a portion of HAMR disk drive 100'. For simplicity, only a portion of the HAMR disk drive 100' and HAMR transducer 130' are shown. For clarity, FIGS. 2A and 2B are not to scale. The HAMR disk drive 100' is analogous to the HAMR disk drive 100. Consequently, analogous components have similar labels. The HAMR disk drive 100' thus includes the write transducer 130' and slider 120'.

The HAMR write transducer 130' includes at least one pole (not shown in FIGS. 2A-2B), and coil(s) (not shown in FIGS.

2A-2B). Other components may also be used, but are not shown for simplicity. For example, the HAMR transducer 130' may include a near-field transducer, other pole(s) and/or shield(s). The HAMR transducer 130' includes two assistant cores 140A and 140B having assistant core entrances 142A and 142B, respectively. The HAMR transducer also includes output devices 150A and 150B corresponding to the assistance cores 140A and 140B, respectively. Components 140A/140B, 142A/142B, 150A/150B correspond to components 140, 142 and 150, respectively, shown in FIG. 1. Referring back to FIGS. 2A-2B, the assistant cores 140A and 140B are located around the target waveguide 132. Thus, the entrances 142A and 142B for the assistant cores 140A and 140B, respectively, are on either side of the target waveguide entrance 133. In the embodiment shown, a single output device 150A/150B corresponds to each assistant core 140A/140B, respectively. However, in other embodiments, multiple output devices may correspond to a single assistant core or vice versa.

In the embodiment shown, the HAMR disk drive 100' includes two assistant cores 140A and 140B having entrances 142A and 142B, respectively, on either side of the target waveguide entrances 133 in the cross track direction. In some embodiments, the assistant core entrances 142A and 142B may be on the same side of the target waveguide entrance 133 in the cross track direction. In other embodiments, the assistant core entrances 142A and 142B may be on either side of the target waveguide entrance 133 in the down track direction. In still other embodiments, the assistant core entrances 142A and 142B may be on the same side of the target waveguide entrance 133 in the down track direction. In the embodiment shown, the assistant core entrances 142A and 142B are not aligned in the cross-track direction. Instead, there is some offset. In some embodiments, the offset may be larger or smaller (including zero).

The assistant cores 140A and 140B may be used in aligning the laser (not shown in FIGS. 2A-2B) with the target waveguide 132 or may be used to check the alignment between the emission exit of the laser (not shown in FIGS. 2A-2B) and the waveguide entrance 133 if the laser subassembly (not shown in FIGS. 2A-2B) is already bonded to the slider 120'. The assistant core entrances 142A and 142B may be in a desired range of distance(s) from the entrance 133 of the target waveguide 132. The distances between the edges of the target waveguide entrance 133 and the edges of the assistant core entrances 142A/142B are in the ranges described above and may be selected using the considerations described above.

The HAMR transducer 130' and disk drive 100' may have improved alignment. Light from the laser (not shown in FIGS. 2A-2B) coupled into the entrances 142A/142B of the assistant cores 140A/140B may be output by the output devices 150A/150B. The intensity of the output light may be measured and used to determine how well the emission exit of the laser (not shown in FIGS. 2A-2B) is aligned with the target waveguide entrance 133. For example, the methods described above may be used to determine the alignment offsets (e.g. in the x or y/down track or cross track directions). If used in alignment, differences in the intensity of the light at the output devices 150A and 150B may be used to determine whether the emission exit of the laser (not shown in FIGS. 2A and 2B) and waveguide entrance 133 are aligned. The relative locations of the slider 120 and laser subassembly (not shown in FIGS. 2A and 2B) may then be adjusted. In some embodiments, the post-bonding alignment of the laser subassembly (not shown in FIGS. 2A and 2B) and the HAMR transducer 130' may be better able to be checked. In such an embodiment, the intensity of the light output by each of the output devices 150 may be used to determine how well the laser emission exit 114 and target waveguide entrance 133 are aligned. Note that because two assistant cores 140A and 140B are used, alignment offsets in the plane of the slider back side may be able to be determined. However, in the embodiment shown, misalignments in the cross track direction may be better able to be determined because only two assistant cores 140A and 140B that are substantially aligned in the cross track direction are used. However, misalignments in the down track direction may be able to be determined from the signals provided by the output devices 150A and 150B.

Thus, using the assistant cores 140A and 140B and output devices 150A and 150B, alignment of the emission exit of the laser with the entrance 133 of the target waveguide 132 may be improved. Alignment prior to bonding and/or a post-bond alignment check may be improved. As a result, the power provided by the laser may be better aligned with the waveguide 132. The power provided to the media for recording may likewise be enhanced. Thus, performance of the HAMR disk drive 100' may be improved.

Figure 3A:
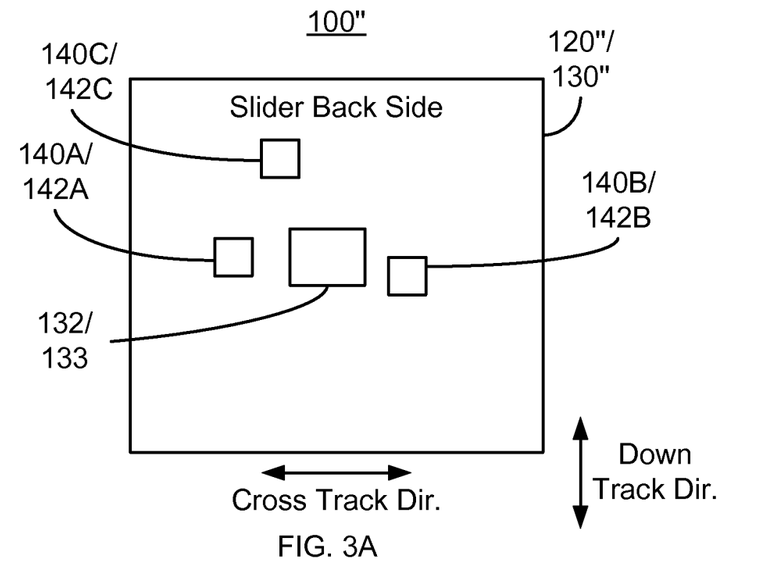
FIGS. 3A-3B are diagrams depicting the back side and side views of an exemplary embodiment of a HAMR transducer.
Figure 3B:
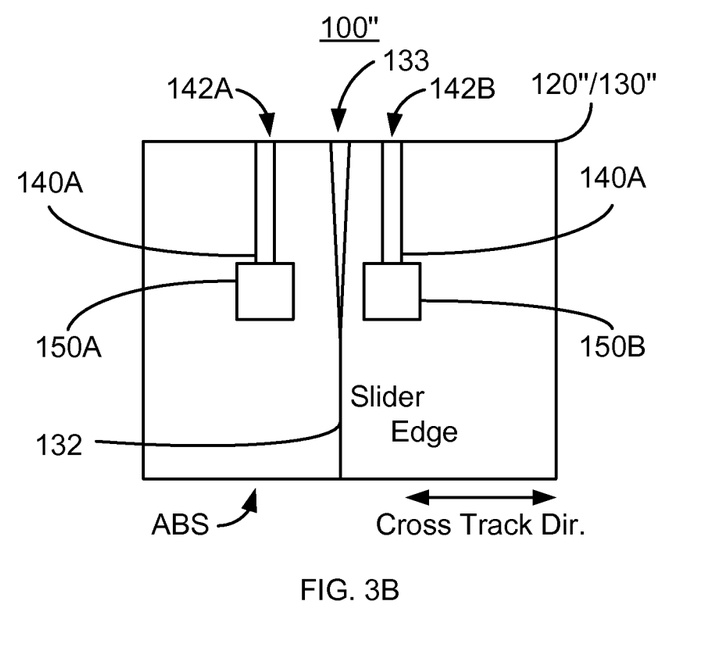

FIGS. 3A and 3B depict back side and down track views, respectively, of an exemplary embodiment of a portion of HAMR disk drive 100". For simplicity, only a portion of the HAMR disk drive 100' and HAMR transducer 130" are shown. For clarity, FIGS. 3A and 3B are not to scale. The HAMR disk drive 100" is analogous to the HAMR disk drives 100 and 100'. Consequently, analogous components have similar labels. The HAMR disk drive 100" thus includes the HAMR write transducer 130" and slider 120".

The HAMR write transducer 130" includes at least one pole (not shown in FIGS. 3A and 3B), and coil(s) (not shown in FIGS. 3A and 3B). Other components may also be used, but are not shown for simplicity. For example, the HAMR transducer 130" may include a near-field transducer, other pole(s) and/or shield(s). The HAMR transducer 130" includes three assistant cores 140A, 140B and 140C having assistant core entrances 142A, 142B, and 142C, respectively. The HAMR transducer 130" also includes output devices 150A, 150B and 150C corresponding to the assistance cores 140A, 140B, and 140C, respectively. Note that only two assistant cores 140A/140B and two output devices 150A/150B are shown in FIG. 3B because a single plane perpendicular to the down track direction and parallel to the slider trailing edge is shown. Components 140A/140B/140C, 142A/142B/142C, 150A/150B'150C correspond to components 140/140A/140B, 142/142A/142B and 150/150A/150B shown in FIGS. 1 and 2A-2B. Referring back to FIGS. 3A and 3B, the assistant cores 140A, 140B and 140C are located around the target waveguide 132. The entrances 142A and 142B for the assistant cores 140A and 140B, respectively, are on either side of the target waveguide entrance 133 in the cross track direction while the assistant core entrance 142C is in the down track direction from the target waveguide entrance 133. In the embodiment shown, a single output device 150A/150B/150C corresponds to each assistant core 140A/140B/140C, respectively. However, in other embodiments, multiple output devices may correspond to a single assistant core or vice versa.

In the embodiment shown, the assistant core entrances 142A, 142B and 142C are around the target waveguide entrance 133 in both the cross track and down track direction. Although a specific distribution of the assistant cores 140A/140B/140C and assistant core entrances 142A/142B/142C is shown, a different distribution is possible. Further, the assistant core entrances 142A, 142B and 142C are shown as being different distances from the target waveguide entrance 133. In another embodiment, these distances may differ. In some such embodiments, the assistant core entrances 142A, 142B and 142C may be equidistant from the target waveguide entrance 133. The distances between the edges of the target waveguide entrance 133 and the edges of the assistant core entrances 142A, 142B and 142C may be in the ranges described above and may be selected using the considerations described above. The assistant cores 140A, 140B and 140C may be used in aligning the laser (not shown in FIGS. 3A-3B) with the target waveguide 132 or may be used to check the alignment between the emission exit of the laser (not shown in FIGS. 3A-3B) and the waveguide entrance 133 if the laser subassembly (not shown in FIGS. 3A-3B) is already bonded to the slider 120".

The HAMR transducer 130" and disk drive 100" may have improved alignment. Light from the laser (not shown in FIGS. 3A-3B) coupled into the entrances 142A/142B/142C of the assistant cores 140A/140B/140C may be output by the output devices 150A/150B/150C. The intensity of the output light may be measured and used to determine how well the emission exit of the laser (not shown in FIGS. 3A-3B) is aligned with the target waveguide entrance 133. For example, the methods described above may be used to determine the alignment offsets (e.g. in the x or y/down track or cross track directions). If used in alignment, differences in the intensity of the light at the output devices 150A, 150B and 150C may be used to determine whether the emission exit of the laser (not shown in FIGS. 3A-3B) and waveguide entrance 133 are aligned. The relative locations of the slider 120" and laser subassembly (not shown in FIGS. 3A-3B) may then be adjusted prior to bonding. In some embodiments, the post-bonding alignment of the laser subassembly (not shown in FIGS. 3A-3B) and the HAMR transducer 130" may be better able to be checked. In such an embodiment, the intensity of the light output by each of the output devices 150A, 150B and 150C may be used to determine how well the laser emission exit (not shown in FIGS. 3A-3B) and target waveguide entrance 133 are aligned.

Thus, using the assistant cores 140A, 140B and 140C and output devices 150A, 150B and 150C, alignment of the emission exit of the laser with the entrance 133 of the target waveguide 132 may be improved. Alignment prior to bonding and/or a post-bond alignment check may be improved. As a result, the power provided by the laser may be better aligned with the waveguide 132. The power provided to the media for recording may likewise be enhanced. Thus, performance of the HAMR disk drive 100" may be improved.

Figure 4A:
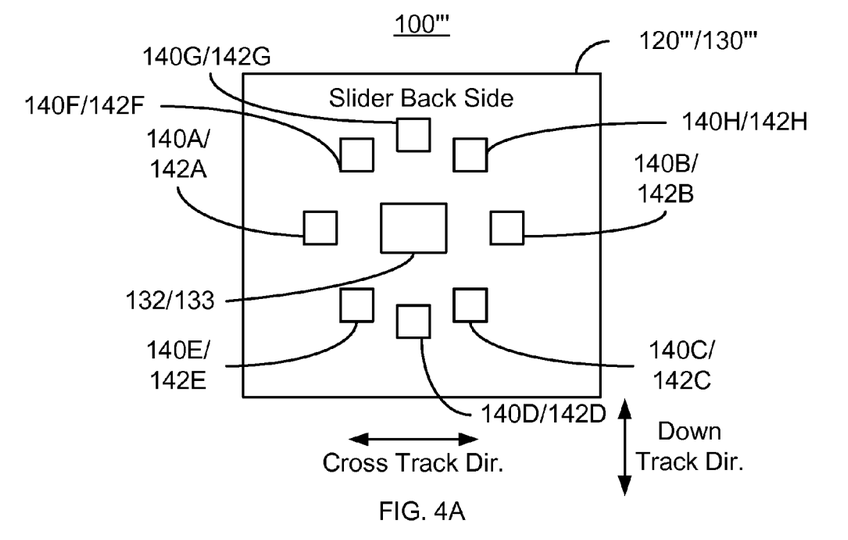
FIGS. 4A-4B are diagrams depicting the back side and side views of an exemplary embodiment of a HAMR transducer.
Figure 4B:
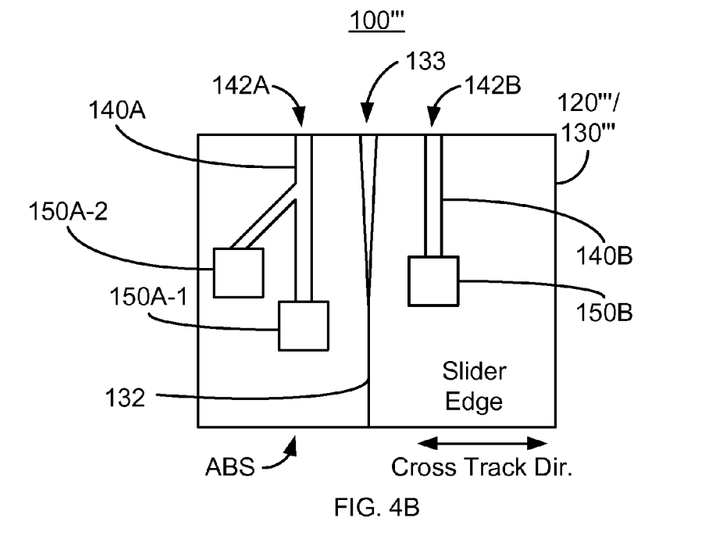

FIGS. 4A and 4B depict back side and down track views, respectively, of an exemplary embodiment of a portion of HAMR disk drive 100'''. For simplicity, only a portion of the HAMR disk drive 100''' and HAMR transducer 130''' are shown. For clarity, FIGS. 4A and 4B are not to scale. The HAMR disk drive 100''' is analogous to the HAMR disk drives 100, 100' and 100". Consequently, analogous components have similar labels. The HAMR disk drive 100''' thus includes the HAMR write transducer 130''' and slider 120'''.

The HAMR write transducer 130''' includes at least one pole (not shown in FIGS. 4A-4B), and coil(s) (not shown in FIGS. 4A-4B). Other components may also be used, but are not shown for simplicity. For example, the HAMR transducer 130''' may include a near-field transducer, other pole(s) and/or shield(s). The HAMR transducer 130''' includes eight assistant cores 140A, 140B, 140C, 140D, 140E, 140F, 140G and 140H having assistant core entrances 142A, 142B, 142C, 142D, 142E, 142F, 142G and 142H, respectively. The HAMR transducer 130''' also includes output devices 150 (of which only 150A-1, 150A-2 and 150B are shown) corresponding to the assistance cores 140A, 140B, 140C, 140D, 140E, 140F, 140G, and 140H, respectively. Note that only two assistant cores 140A/140B and three output devices 150A-1/150A-2/150B are shown in FIG. 4B because a single plane perpendicular to the down track direction and parallel to the slider trailing edge is shown. Components 140A, 140B, 140C, 140D, 140E, 140F, 140G and 140H, 142A, 142B, 142C, 142D, 142E, 142F, 142G and 140H, 150A, 150B, 150C, 150D, 150E, 150F, 150G and 150H correspond to components 140, 140A, 140B and 140C, 142, 142A, 142B and 142C and 150, 150A, 150B and 150C shown in FIGS. 1, 2A-2B and 3A-3B. Referring back to FIGS. 4A and 4B, the assistant cores 140A, 140B, 140C, 140D, 140E, 140F, 140G and 140H are located around the target waveguide 132. The entrances 142A, 142B, 142C, 142D, 142E, 142F, 142G and 142H for the assistant cores 140A, 140B, 140C, 140D, 140E, 140F, 140G and 140H are distributed around the target waveguide entrance 133 in the cross track and down track directions. In the embodiment shown, a single output device 150B corresponds to the assistant core 140B. However, two output devices 150A-1 and 150A-2 correspond to the assistant core 140A. The remaining assistant cores 140C, 140D, 140E, 140F, 140G and 140H may have one, two or another number of output devices. In other embodiments, other number(s) of output devices may correspond to a single assistant core.

In the embodiment shown, the assistant core entrances 142A, 142B, 142C, 142D, 142E, 142F, 142G and 142H are substantially evenly distributed around the target waveguide entrance 133 in both the cross track and down track direction. Although a specific distribution of the assistant cores 140A, 140B, 140C, 140D, 140E, 140F, 140G and 140H and assistant core entrances 142A, 142B, 142C, 142D, 142E, 142F, 142G and 142H is shown, a different distribution is possible. Further, the assistant core entrances 142A, 142B, 142C, 142D, 142E, 142F, 142G and 142H are shown as being substantially equidistant from the target waveguide entrance 133. In another embodiment, these distances may differ. The distances between the edges of the target waveguide entrance 133 and the edges of the assistant core entrances 142A, 142B, 142C, 142D, 142E, 142F, 142G and 142H may be in the ranges described above and may be selected using the considerations described above. The assistant cores 140A, 140B, 140C, 140D, 140E, 140F, 140G and 140H may be used in aligning the laser (not shown in FIGS. 4A-4B) with the target waveguide 132 or may be used to check the alignment between the emission exit of the laser (not shown in FIGS. 4A-4B) and the waveguide entrance 133 if the laser subassembly (not shown in FIGS. 4A-4B) is already bonded to the slider 120'''.

The HAMR transducer 130''' and disk drive 100''' may have improved alignment. Light from the laser (not shown in FIGS. 4A-4B) coupled into the entrances 142A, 142B, 142C, 142D, 142E, 142F, 142G and 142H of the assistant cores 140A, 140B, 140C, 140D, 140E, 140F, 140G and 140H may be output by the output devices 150. The intensity of the output light may be measured and used to determine how well the emission exit of the laser (not shown in FIGS. 4A-4B) is aligned with the target waveguide entrance 133. For example, the methods described above may be used to determine the alignment offsets (e.g. in the x or y/down track or cross track directions). If used in alignment, differences in the intensity of the light at the output devices 150 may be used to determine whether the emission exit of the laser (not shown in FIGS. 4A-4B) and waveguide entrance 133 are aligned. The relative locations of the slider 120''' and laser subassembly (not shown in FIGS. 4A-4B) may then be adjusted prior to bonding. In some embodiments, the post-bonding alignment of the laser subassembly (not shown in FIGS. 4A-4B) and the HAMR transducer 130''' may be better able to be checked. In such an embodiment, the intensity of the light output by each of the output devices 150 may be used to determine how well the laser emission exit (not shown in FIGS. 4A-4B) and target waveguide entrance 133 are aligned.

Thus, using the assistant cores 140A, 140B, 140C, 140D, 140E, 140F, 140G and 140H and output devices 150, alignment of the emission exit of the laser with the entrance 133 of the target waveguide 132 may be improved. Alignment prior to bonding and/or a post-bond alignment check may be improved. As a result, the power provided by the laser may be better aligned with the waveguide 132. The power provided to the media for recording may likewise be enhanced. Thus, performance of the HAMR disk drive 100" may be improved.

Figure 5A:
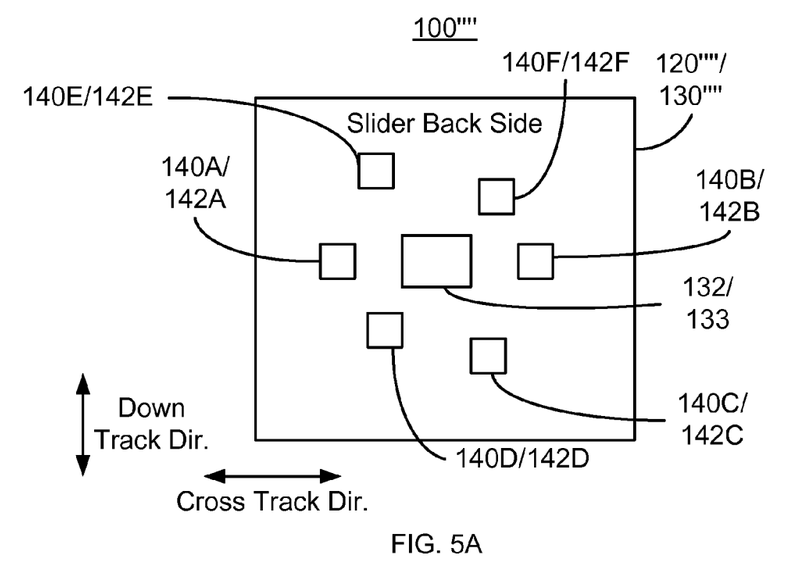
FIGS. 5A-5B are diagrams depicting the back side and side views of an exemplary embodiment of a HAMR transducer.
Figure 5B:
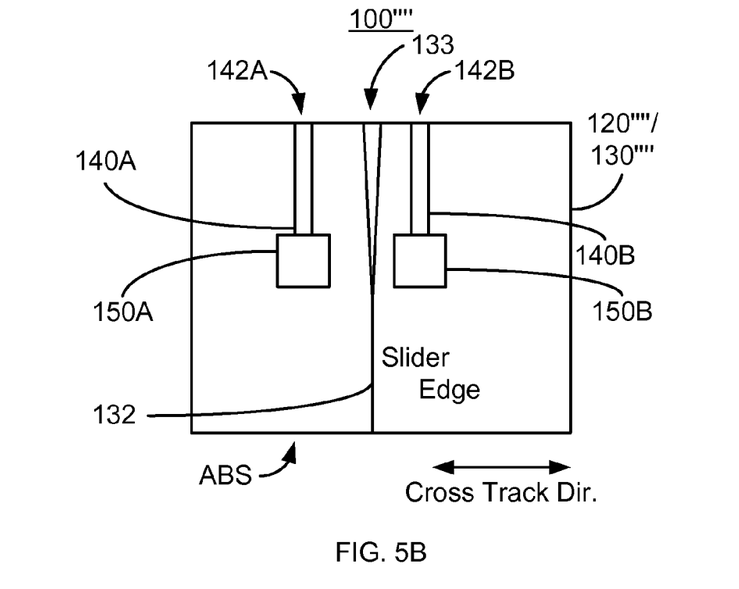

FIGS. 5A and 5B depict back side and down track views, respectively, of an exemplary embodiment of a portion of HAMR disk drive 100''''. For simplicity, only a portion of the HAMR disk drive 100'''' and HAMR transducer 130'''' are shown. For clarity, FIGS. 5A and 5B are not to scale. The HAMR disk drive 100'''' is analogous to the HAMR disk drives 100, 100', 100" and 100'''. Consequently, analogous components have similar labels. The HAMR disk drive 100'''' thus includes the HAMR write transducer 130'''' and slider 120''''.

The HAMR write transducer 130'''' includes at least one pole (not shown in FIGS. 5A-5B), and coil(s) (not shown in FIGS. 5A-5B). Other components may also be used, but are not shown for simplicity. For example, the HAMR transducer 130'''' may include a near-field transducer, other pole(s) and/or shield(s). The HAMR transducer 130'''' includes six assistant cores 140A, 140B, 140C, 140D, 140E, and 140F having assistant core entrances 142A, 142B, 142C, 142D, 142E and 142F, respectively. The HAMR transducer 130''' also includes output devices 150 (of which only 150A and 150B are shown) corresponding to the assistance cores 140A, 140B, 140C, 140D, 140E and 140F, respectively. Note that only two assistant cores 140A/140B and two output devices 150A/150B are shown in FIG. 5B because a single plane perpendicular to the down track direction and parallel to the slider trailing edge is shown. Components 140A, 140B, 140C, 140D, 140E and 140F; 142A, 142B, 142C, 142D, 142E and 142F; 150 correspond to components 140, 140A, 140B, 140C, 140D, 140E, 140F, 140G and 140H; 142, 142A, 142B, 142C, 142D, 142E, 142F, 142G and 142H and 150, 150A, 150B, 150C, 150A-1 and 150A-2 shown in FIGS. 1, 2A-2B, 3A-3B and 4A-4B. Referring back to FIGS. 5A and 5B, the assistant cores 140A, 140B, 140C, 140D, 140E and 140F are located around the target waveguide 132. The entrances 142A, 142B, 142C, 142D, 142E and 142F for the assistant cores 140A, 140B, 140C, 140D, 140E and 140F are distributed around the target waveguide entrance 133 in the cross track and down track directions. In the embodiment shown, a single output device 150A/150B corresponds to the assistant core 140A/140B. The remaining assistant cores 140C, 140D, 140E, 140F and 140G may have one, two or another number of output devices. In other embodiments, other number(s) of output devices may correspond to a single assistant core and vice versa.

In the embodiment shown, the assistant core entrances 142A, 142B, 142C, 142D, 142E and 142F are substantially evenly distributed around the target waveguide entrance 133 in both the cross track and down track direction. Although a specific distribution of the assistant cores 140A, 140B, 140C, 140D, 140E and 140F and assistant core entrances 142A, 142B, 142C, 142D, 142E and 142F is shown, a different distribution is possible. Further, the assistant core entrances 142A, 142B, 142C, 142D, 142E and 142F are shown as being different distances from the target waveguide entrance 133. In another embodiment, these distances may differ. For example, the assistant core entrances 142A, 142B, 142C, 142D, 142E and 142F may be equidistant from the target waveguide entrance 133. The distances between the edges of the target waveguide entrance 133 and the edges of the assistant core entrances 142A, 142B, 142C, 142D, 142E and 142F may be in the ranges described above and may be selected using the considerations described above. The assistant cores 140A, 140B, 140C, 140D, 140E and 140F may be used in aligning the laser (not shown in FIGS. 5A-5B) with the target waveguide 132 or may be used to check the alignment between the emission exit of the laser (not shown in FIGS. 5A-5B) and the waveguide entrance 133 if the laser subassembly (not shown in FIGS. 5A-5B) is already bonded to the slider 120''''.

The HAMR transducer 130'''' and disk drive 100'''' may have improved alignment. Light from the laser (not shown in FIGS. 5A-5B) coupled into the entrances 142A, 142B, 142C, 142D, 142E and 142F of the assistant cores 140A, 140B, 140C, 140D, 140E and 140F may be output by the output devices 150. The intensity of the output light may be measured and used to determine how well the emission exit of the laser (not shown in FIGS. 5A-5B) is aligned with the target waveguide entrance 133. For example, the methods described above may be used to determine the alignment offsets (e.g. in the x or y/down track or cross track directions). If used in alignment, differences in the intensity of the light at the output devices 150 may be used to determine whether the emission exit of the laser (not shown in FIGS. 5A-5B) and waveguide entrance 133 are aligned. The relative locations of the slider 120'''' and laser subassembly (not shown in FIGS. 5A-5B) may then be adjusted prior to bonding. In some embodiments, the post-bonding alignment of the laser subassembly (not shown in FIGS. 5A-5B) and the HAMR transducer 130'''' may be better able to be checked. In such an embodiment, the intensity of the light output by each of the output devices 150 may be used to determine how well the laser emission exit (not shown in FIGS. 5A-5B) and target waveguide entrance 133 are aligned.

Thus, using the assistant cores 140A, 140B, 140C, 140D, 140E and 140F and output devices 150, alignment of the emission exit of the laser with the entrance 133 of the target waveguide 132 may be improved. Alignment prior to bonding and/or a post-bond alignment check may be improved. As a result, the power provided by the laser may be better aligned with the waveguide 132. The power provided to the media for recording may likewise be enhanced. Thus, performance of the HAMR disk drive 100''' may be improved.

Figure 6A:
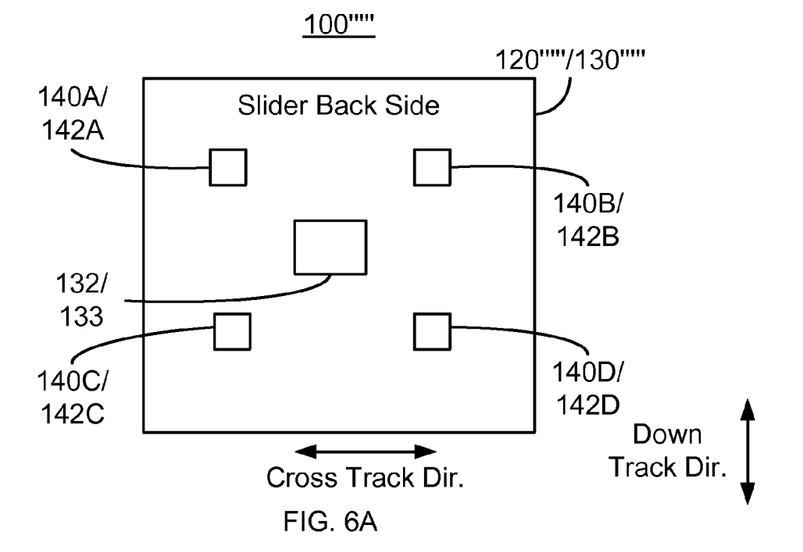
FIGS. 6A-6B are diagrams depicting the back side and side views of an exemplary embodiment of a HAMR transducer.
Figure 6B:
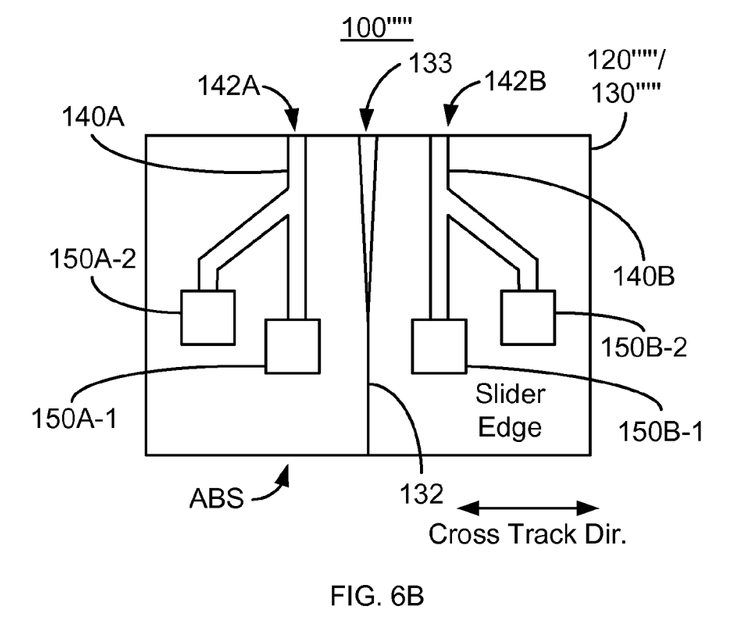

FIGS. 6A and 6B depict back side and down track views, respectively, of an exemplary embodiment of a portion of HAMR disk drive 100'''''. For simplicity, only a portion of the HAMR disk drive 100''''' and HAMR transducer 130''''' are shown. For clarity, FIGS. 6A and 6B are not to scale. The HAMR disk drive 100'''' is analogous to the HAMR disk drives 100, 100', 100", 100''' and 100''''. Consequently, analogous components have similar labels. The HAMR disk drive 100''''' thus includes the HAMR write transducer 130''''' and slider 120'''''.

The HAMR write transducer 130''''' includes at least one pole (not shown in FIGS. 6A-6B), and coil(s) (not shown in FIGS. 6A-6B). Other components may also be used, but are not shown for simplicity. For example, the HAMR transducer 130''''' may include a near-field transducer, other pole(s) and/or shield(s). The HAMR transducer 130''''' includes four assistant cores 140A, 140B, 140C and 140D having assistant core entrances 142A, 142B, 142C and 142D, respectively, arranged in a rectangular array. The HAMR transducer 130"" also includes output devices 150 (of which only 150A-1, 150A-2, 150B-1 and 150B-2 are shown) corresponding to the assistance cores 140A, 140B, 140C and 140D, respectively. Note that only two assistant cores 140A/140B and four output devices 150A-1/150A-2/150B-1/150B-2 are shown in FIG. 6B because a single plane perpendicular to the down track direction and parallel to the slider trailing edge is shown. Components 140A, 140B, 140C and 140D; 142A, 142B, 142C and 142D; and 150A-1, 150A-2, 150B-1 and 150B-2 correspond to components 140, 140A, 140B, 140C, 140D, 140E, 140F, 140G and 140H; 142, 142A, 142B, 142C, 142D, 142E, 142F, 142G and 142H and 150, 150A, 150B, 150C, 150A-1 and 150A-2 shown in FIGS. 1, 2A-2B, 3A-3B, 4A-4B and 5A-5B. Referring back to FIGS. 6A and 6B, the assistant cores 140A, 140B, 140C and 140D are located in a rectangular array around the target waveguide 132. The entrances 142A, 142B, 142C and 142D for the assistant cores 140A, 140B, 140C and 140D are distributed around the target waveguide entrance 133 in the cross track and down track directions. In the embodiment shown, a two output device 150A-1 and 150A-2/150B-1 and 150B-2 corresponds to each assistant core 140A/140B. The remaining assistant cores 140C and 140D may have one, two or another number of output devices. In other embodiments, other number(s) of output devices may correspond to a single assistant core and vice versa.

In the embodiment shown, the assistant core entrances 142A, 142B, 142C and 142D are substantially evenly distributed around the target waveguide entrance 133 in both the cross track and down track direction. Although a specific distribution of the assistant cores 140A, 140B, 140C and 140D and assistant core entrances 142A, 142B, 142C and 142D is shown, a different distribution is possible. Further, the assistant core entrances 142A, 142B, 142C and 142D are shown as being different distances from the target waveguide entrance 133. In another embodiment, these distances may differ. For example, the assistant core entrances 142A, 142B, 142C, 142D, 142E and 142F may be equidistant from the target waveguide entrance 133. The distances between the edges of the target waveguide entrance 133 and the edges of the assistant core entrances 142A, 142B, 142C and 142D may be in the ranges described above and may be selected using the considerations described above. The assistant cores 140A, 140B, 140C and 140D be used in aligning the laser (not shown in FIGS. 6A-6B) with the target waveguide 132 or may be used to check the alignment between the emission exit of the laser (not shown in FIGS. 6A-6B) and the waveguide entrance 133 if the laser subassembly (not shown in FIGS. 6A-6B) is already bonded to the slider 120"".

The HAMR transducer 130"" and disk drive 100"" may have improved alignment. Light from the laser (not shown in FIGS. 6A-6B) coupled into the entrances 142A, 142B, 142C and 142D of the assistant cores 140A, 140B, 140C and 140D may be output by the output devices 150. The intensity of the output light may be measured and used to determine how well the emission exit of the laser (not shown in FIGS. 6A-6B) is aligned with the target waveguide entrance 133. For example, the methods described above may be used to determine the alignment offsets (e.g. in the x or y/down track or cross track directions). If used in alignment, differences in the intensity of the light at the output devices 150 may be used to determine whether the emission exit of the laser (not shown in FIGS. 6A-6B) and waveguide entrance 133 are aligned. The relative locations of the slider 120"" and laser subassembly (not shown in FIGS. 6A-6B) may then be adjusted prior to bonding. In some embodiments, the post-bonding alignment of the laser subassembly (not shown in FIGS. 6A-6) and the HAMR transducer 130"" may be better able to be checked. In such an embodiment, the intensity of the light output by each of the output devices 150 may be used to determine how well the laser emission exit (not shown in FIGS. 6A-6B) and target waveguide entrance 133 are aligned.

Thus, using the assistant cores 140A, 140B, 140C and 140D and output devices 150, alignment of the emission exit of the laser with the entrance 133 of the target waveguide 132 may be improved. Alignment prior to bonding and/or a post-bond alignment check may be improved. As a result, the power provided by the laser may be better aligned with the waveguide 132. The power provided to the media for recording may likewise be enhanced. Thus, performance of the HAMR disk drive 100"" may be improved. Although different features of the HAMR disk drives 100, 100', 100", 100'", 100"" and 100'"" are highlighted in FIGS. 1, 2A-2B, 3A-3B, 4A-4B, 5A-5B and 6A-6B, various features of the disk drives 100, 100', 100", 100'", 100"" and 100'"" may be combined in other embodiments.

Figure 7:
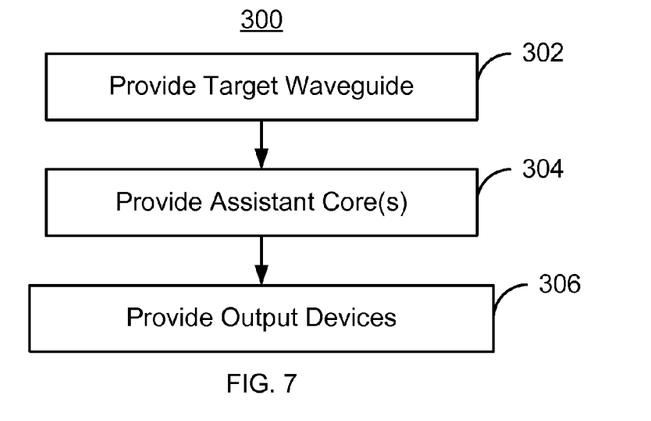
FIG. 7 is a flow chart depicting an exemplary embodiment of a method for providing a HAMR transducer.

FIG. 7 is a flow chart depicting an exemplary embodiment of a method 300 for providing a HAMR head having assistant core waveguides, such as the HAMR heads 100, 100', 100", 100'", 100"", 100'"" and/or another analogous head. For simplicity, only some steps are shown. Further, the steps may include one or more substeps. Steps may also be combined, interleaved, and/or performed in another order. The method 300 is described in the context of the HAMR disk drive 100. However, the method 300 may be used to form another device (not shown). Further, the method 300 starts after other components in the disk drive are fabricated. For example, the read transducer may be fabricated. In some embodiments, the pole 134 and at least part of the coils 136 are also formed.

The target waveguide 132 is fabricated, via step 302. Step 302 includes depositing and patterning the core and cladding of the waveguide 132. The assistant cores 140 are also fabricated, via step 304. Step 304 includes depositing and patterning the core and cladding for the assistant cores 140. The output devices 150 are also provided, via step 306.

Using the method 300, one or more of the disk drives 100, 100', 100", 100'", 100"" and/or 100'"", as well as analogous drives, may be fabricated. Consequently, the benefits of the disk drives 100, 100', 100", 100'", 100"" and/or 100'"" may be realized.

Figure 8:
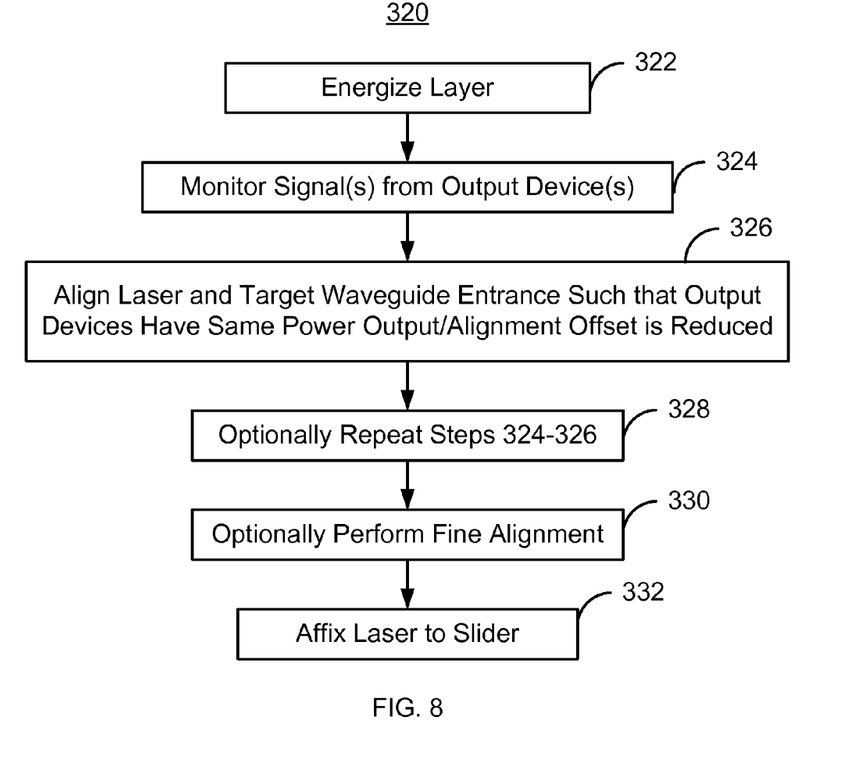
FIG. 8 is a flow chart depicting an exemplary embodiment of a method for providing aligning and bonding components for a HAMR disk drive.

FIG. 8 is a flow chart depicting an exemplary embodiment of a method 320 for aligning a HAMR head having assistant core waveguides, such as the HAMR disk drives 100, 100', 100", 100'", 100"", 100'"" and/or another analogous head. For simplicity, only some steps are shown and the method 320 is described in context of the HAMR disk drive 100. However, the method 320 may be used to form another device (not shown). Further, the steps may include one or more substeps. Steps may also be combined, interleaved, and/or performed in another order. The method 320 may start after the laser subassembly 110 is brought into proximity to the slider 120. More specifically, the laser subassembly 110 may be brought relatively close to the end of the slider 120 on which the HAMR transducer 130 has been fabricated.

The laser 112 is energized, via step 322. In some embodiments, the operating power of the laser 112 may be used. However, other powers may be used in other embodiments. Consequently, the laser 112 emits energy from the emission exit 114. The laser light thus forms a spot on the back side 121 of the slider 120.

The output devices 150 are monitored, via step 324. Step 324 may include measuring the intensity of the light at each of the output devices 150. In some embodiments, step 324 may also include determining a measure of the misalignment between the emission exit 114 and the target waveguide entrance 133. For example, one or more of the methodologies described above may be used to determine the offset between the emission exit 114 and the target waveguide entrance 133.

The laser emission exit 114 and the target waveguide entrance 144 are aligned using the information from the output devices, via step 326. In some embodiments step 326 includes adjusting the position(s) of the laser subassembly 110 and/or the slider 120 to reduce the alignment offset(s). In some embodiments, the position(s) of the laser subassembly 110 and/or the slider 120 are adjust such that the difference in the signals from the output devices is reduced. In some such embodiments, this continues until the output devices 150 have substantially the same power output. Steps 324 and 326 are optionally repeated until the desired alignment is achieved, via step 328.

Assuming that the alignment using the assistant cores 140 is a coarse alignment, a fine alignment between the laser emission exit 114 and the target waveguide entrance 133 may optionally be performed, via step 330. Step 330 may use the fiducial marks 116 and 138 and/or may use active alignment using the laser 112 and target waveguide 132. Other methodologies may also be employed. However, in other embodiments, step 330 may be skipped. After the desired alignment is achieved, the laser 112 is affixed to the slider 120, via step 332. In some embodiments, this step includes bonding the laser subassembly 101 to the slider 120.

Using the method 320, the laser emission exit 114 may be better aligned with the target waveguide entrance 133. Thus, one or more of the disk drives 100, 100', 100'', 100''', 100'''' and/or 100''''', as well as analogous drives, may be fabricated. Consequently, the benefits of the disk drives 100, 100', 100'', 100''', 100'''' and/or 100''''' may be realized.

Figure 9:
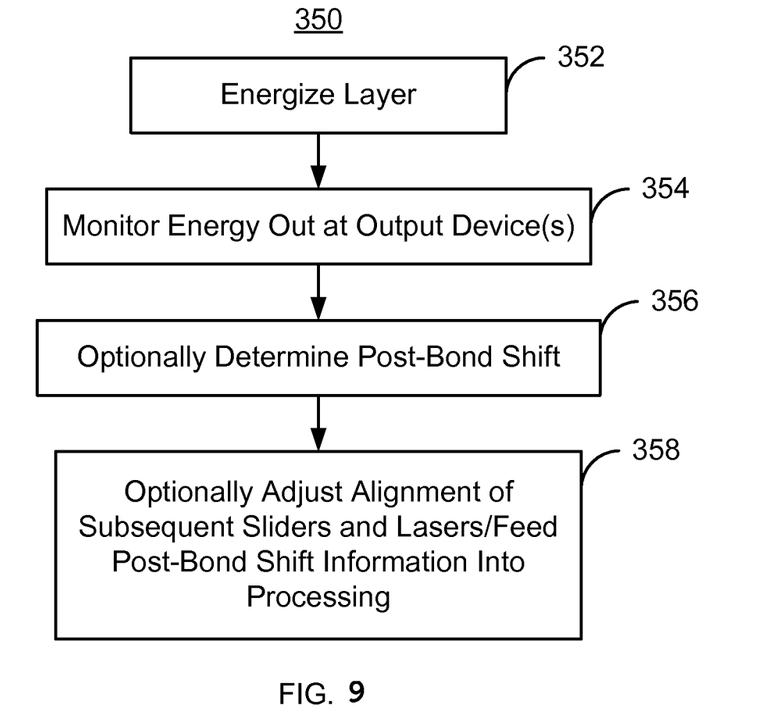
FIG. 9 is a flow chart depicting an exemplary embodiment of a method for testing alignment of components in a HAMR disk drive.

FIG. 9 is a flow chart depicting an exemplary embodiment of a method 350 for checking the alignment a HAMR head having assistant core waveguides, such as the HAMR disk drives 100, 100', 100'', 100''', 100'''', 100''''' and/or another analogous head. For simplicity, only some steps are shown and the method 350 is described in context of the HAMR disk drive 100. However, the method 350 may be used to form another device (not shown). Further, the steps may include one or more substeps. Steps may also be combined, interleaved, and/or performed in another order. The method 350 may start after the laser subassembly 110 is bonded to the slider 120. Thus, the method 350 may be used to determine a post-bond shift in the positions of the laser 112 and the target waveguide 132.

The laser 112 is energized, via step 352. In some embodiments, the operating power of the laser 112 may be used. However, other powers may be used in other embodiments. Consequently, the laser 112 emits energy from the emission exit 114. Some portion of the laser light is coupled into the target waveguide 132. However, the spot size of the laser 112 is generally larger than the size of the waveguide entrance 133. Thus, a portion of the laser light enters the assistant core(s) 140 at the assistant core entrance(s) 142.

The output devices 150 are monitored, via step 354. Step 354 may include measuring the intensity of the light at each of the output devices 150.

A post-bond alignment shift may be determined based on the signal(s) from the output device(s) 150, via step 356. In some embodiments, step 356 may also include determining a measure of the misalignment between the emission exit 114 and the target waveguide entrance 133. For example, one or more of the methodologies described above may be used to determine the offset between the emission exit 114 and the target waveguide entrance 133. The alignment shifts determined in step 356 may occur during bonding of the laser 112/laser subassembly 110 to the slider 120.

The information obtained in step 356 is fed back into the fabrication and/or alignment process for the HAMR disk drives 100, via step 358. Step 358 may include adjusting the alignment of a subsequent HAMR transducer based on the post-bond shift determined in step 356. For example, it may be determined that after bonding, the laser emission exit 114 shifts from a position of alignment with target waveguide entrance 133 to being misaligned. It may be desirable for the alignment process to introduce a shift in the pre-bond positions of the laser 112 and target waveguide 132. After bonding, the shift introduced during the bond may then result in a better alignment between the laser 112 and target waveguide entrance 133 than if the components are perfectly aligned prior to bonding. In other embodiments, the post-bond shift may be accounted for in another manner, such as the way in which the laser 112 and/or slider 120 are held in position during bonding. Thus, subsequent HAMR disk drives 100 may have improved alignment. Even if the information on post-bonding misalignment is not used in step 358 to change alignment of subsequent HAMR disk drives 100, the HAMR transducer 120 being tested may be considered to pass or fail based on the post bond shift determined in step 356. Thus, the method 350 may also be used for quality control.

Using the method 350, the laser emission exit 114 may be better aligned with the target waveguide entrance 133. Thus, one or more of the disk drives 100, 100', 100'', 100''', 100'''' and/or 100''''', as well as analogous drives, may be fabricated. Further, the method 350 may simply be used to check to see whether particular HAMR disk drives meet alignment standards. HAMR transducers 130 may then be accepted or rejected based in part on this determination. Consequently, the benefits of the disk drives 100, 100', 100'', 100''', 100'''' and/or 100''''' may be realized.

We claim:

1. A heat assisted magnetic recording (HAMR) transducer residing on a slider and having an air-bearing surface (ABS) and a back side, the HAMR transducer comprising:
   a target waveguide having an entrance at the back side, the target waveguide for directing energy in a spot provided by a laser from the entrance at the back side toward the ABS;
   a plurality of assistant cores having a plurality of assistant core entrances at the back side, the plurality of assistant core entrances being configured to receive a portion of the energy from the spot at least if the spot is misaligned from the target waveguide; and
   a plurality of output devices, the plurality of assistant cores directing the portion of the energy from the plurality of assistant core entrances to the plurality of output devices.

2. The HAMR transducer of claim 1 wherein the plurality of assistant core entrances are distributed around the entrance of the target waveguide.

3. The HAMR transducer of claim 2 wherein the plurality of assistant core entrances are substantially evenly distributed around the entrance of the target waveguide.

4. The HAMR transducer of claim 2 wherein the plurality of assistant core entrance are substantially equidistant from the entrance of the target waveguide.

5. The HAMR transducer of claim 2 wherein the plurality of assistant core entrances form a rectangle around the entrance of the target waveguide.

6. The HAMR transducer of claim 5 wherein an entrance of each of the plurality of assistant core entrances is at least one-half micron from the entrance of the target waveguide.

7. The HAMR transducer of claim 6 wherein the entrance of each of the plurality of assistant core entrances is not more than one and one-half micron from the entrance of the target waveguide.

8. The HAMR transducer of claim 7 wherein the entrance of each of the plurality of assistant core entrances is not more than one micron from the entrance of the target waveguide.

9. The HAMR transducer of claim 2 wherein the plurality of assistant core waveguides are asymmetrically distributed around the target waveguide.

10. The HAMR transducer of claim 1 wherein the plurality of output devices include a plurality of output gratings.

11. A method for aligning a laser diode on a laser substrate to a target waveguide for a heat assisted magnetic recording (HAMR) transducer on a slider, the target waveguide having an entrance on a back side of the slider and for directing light toward an air-bearing surface (ABS) opposite to the back side of the slider, the method comprising:
energizing the laser; and
monitoring a plurality of output devices, the plurality of output devices corresponding to a plurality of assistant cores on the slider, the plurality of assistant cores having a plurality of assistant core entrances at the back side and for directing energy from the laser from the plurality of entrances to the plurality of output devices;
coarsely aligning the laser and the target waveguide such that the plurality of output devices have substantially the same power output;
performing a fine alignment between the laser and the target waveguide.

12. The method of claim 11 wherein the plurality of assistant core entrances are distributed around the entrance of the target waveguide.

13. The method of claim 11 wherein the plurality of assistant core entrances are substantially evenly distributed around the entrance of the target waveguide.

14. The method of claim 11 wherein the plurality of assistant core entrances form a rectangle around the entrance of the target waveguide.

15. The method of claim 11 wherein the plurality of output devices include a plurality of output gratings.

16. The method of claim 11 further comprising:
affixing the laser substrate to the slider after the step of performing the fine alignment.

17. A method for checking for alignment of a laser diode on a laser substrate to a target waveguide for a heat assisted magnetic recording (HAMR) transducer on a slider, the target waveguide having an entrance on a back side of the slider and for directing light toward an air-bearing surface (ABS) opposite to the back side of the slider, the method comprising:
energizing the laser;
monitoring a plurality of output devices, the plurality of output devices corresponding to a plurality of assistant cores on the slider, the plurality of assistant cores having a plurality of assistant core entrances at the back side and for directing energy from the laser from the plurality of entrances to the plurality of output devices; and
determining a post-bond shift based on a power output of each of the plurality of output devices.

18. The method of claim 17 further comprising:
adjusting an alignment of a subsequent HAMR transducer based on the post-bond shift.

19. A heat assisted magnetic recording (HAMR) disk drive comprising:
a media;
a laser having an emission exit for providing energy for use in HAMR;
a slider having an air-bearing surface (ABS), a back side, and a HAMR transducer, the energy from the emission exit forming a spot on the back side of the slider, the HAMR transducer including a target waveguide, a plurality of assistant cores and a plurality of output devices, the target waveguide having an entrance at the back side, the target waveguide for directing energy in the spot provided by the laser from the entrance at the back side toward the ABS, the plurality of assistant cores having a plurality of assistant core entrances at the back side, the plurality of assistant core entrances being configured to receive a portion of the energy from the spot at least if the spot is misaligned from the target waveguide, the plurality of assistant cores directing the portion of the energy from the plurality of assistant core entrances to the plurality of output devices.

* * * * *